(12) United States Patent
Eriksson

(10) Patent No.: US 6,553,942 B1
(45) Date of Patent: Apr. 29, 2003

(54) APPARATUS FOR TEAT TREATMENT

(75) Inventor: Jan Eriksson, Uttran (SE)

(73) Assignee: DeLaval Holding AB, Tumba (SE)

( * ) Notice: Subject to any disclaimer, the term of this patent is extended or adjusted under 35 U.S.C. 154(b) by 0 days.

(21) Appl. No.: 09/959,758

(22) PCT Filed: May 4, 2000

(86) PCT No.: PCT/SE00/00875
§ 371 (c)(1),
(2), (4) Date: Jan. 23, 2002

(87) PCT Pub. No.: WO00/67562
PCT Pub. Date: Nov. 16, 2000

(30) Foreign Application Priority Data

May 6, 1999 (SE) ................................. 9901647

(51) Int. Cl.$^7$ ................................................ A01J 5/017
(52) U.S. Cl. .................................. 119/670; 119/14.18
(58) Field of Search ............................. 119/670, 14.18, 119/14.01, 14.03

(56) References Cited

U.S. PATENT DOCUMENTS 5,950,562 A * 9/1999 Schulte et al. ........... 119/51.02
6,189,486 B1 * 2/2001 Lindholm ................ 119/14.02
6,279,507 B1 * 8/2001 van der Lely et al. .... 119/14.01

FOREIGN PATENT DOCUMENTS

| EP | 0 322 231 | 9/1989 |
|---|---|---|
| EP | 0 572 068 | 12/1993 |
| EP | 0 749 682 | 12/1996 |
| EP | 0 882 393 | 12/1998 |
| GB | 1 273 345 | 5/1972 |
| GB | 2 272 626 | 5/1994 |
| GB | 2 272 971 | 6/1994 |
| WO | 02/07098 A1 * | 1/2002 |

* cited by examiner

Primary Examiner—Yvonne Abbott
(74) Attorney, Agent, or Firm—Young & Thompson

(57) ABSTRACT

An apparatus for cleaning teats of a milking animal includes a teat cleaning device (60) having cleaning elements (70, 80, 90) for performing a cleaning action with regard to a teat of the animal to be cleaned. The apparatus is equipped with elements (10, 15, 20) for establishing the identity of the animal to be cleaned as well as control elements (30, 31, 40, 48) for controlling the teat cleaning device (60). This control is carried out in dependence on the established identity in such a way that an individually adapted cleaning action is obtained, which is sufficient and gentle for the animal.

10 Claims, 5 Drawing Sheets

APPARATUS FOR TEAT TREATMENT

TECHNICAL FIELD OF THE INVENTION

The invention relates to an apparatus for cleaning teats of an animal.

BACKGROUND OF THE INVENTION

History in the field of automatic milking of animals is rather extensive. For the purpose of obtaining a high quality diary production it is important to clean the teats of an animal to be milked, prior to performing the actual milking.

European patent application 0 535 755 discloses a milking robot having a robot arm provided with an implement for cleaning teats. The implement is provided with brushes arranged in a bowl, which bowl has a shaft-like bottom end with an outlet for draining off a liquid cleansing agent. The liquid cleansing agent is supplied to the bowl through a supply line connector provided on the bowl. A sensor is provided at the foot of the shaft-like bottom end of the bowl for establishing the extent of contamination of the liquid being drained. A flow of liquid cleansing agent, from the supply line connector to the outlet of the bowl, is maintained until the sensor establishes that the contamination of the liquid cleaning agent has come below a pre-determined standard. According to EP 0 535 755 it is then assumed that the animal's teats have been cleaned sufficiently, which permits the bowl to be removed and teat cups to be connected to the teats so that the process of milking can take place.

SUMMARY OF THE INVENTION

Teat cleaning for a long duration of time may cause problems with udder and/or teat irritation possibly leading to skin eczema, especially when the teat cleaning is applied frequently. The present invention relates to the problem of eliminating, or at least reducing, the occurrence of health problems caused by teat cleaning, and to an improvement of the gentleness of the teat cleaning process as experienced by the milk producing animals, as well as a reduction of the cleaning process time.

Analysis of the contamination of the drained liquid cleansing agent, which agent has been used for teat cleaning, by a sensor involves several complications. An example of these complications is the time delay between the time when a certain particle of the liquid cleansing agent is in cleaning position and the subsequent time when the agent and its degree of contamination may be sensed. The sensing equipment must be clean, calibrated and in good order to work properly. Different types of contamination are sensed by different sensors, which for optimal operation requires quite a number of sensors and processing techniques forming a vulnerable sensor system.

Another difficulty is to sense whether lumps occur or dry mud causing a high degree of contamination, but not much sedimentation of the liquid. Without any consideration to for instance lumps versus sedimentation, a sensor will be defective without an accurate calibration. One object of the invention according to this application is to provide a solution of the above mentioned problems through an introduction of less complicated techniques and by means of embodiments with fewer and less vulnerable components.

According to one embodiment of the invention this problem is addressed by an apparatus for cleaning teats of an animal, whereby the apparatus comprises a teat cleaning device having means for performing a cleaning action with regard to a teat of an animal to be cleaned. The apparatus is equipped with means for establishing the identity of the animal to be cleaned as well as means for controlling the teat cleaning device. This control is carried out in dependence on the established identity in such a way that an individually adapted cleaning action is obtained.

This solution advantageously makes it possible to reduce the occurrence of teat cleaning symptoms, while obtaining a high cleaning standard of the teats to be milked and treated as well as providing a cleaning action which is experienced as comfortable by the individual animal during the cleaning process. In this connection it is noted that milk producing animals, just like humans, exhibit individual differences as regards their behaviour. Among the animals, some individuals have a habit of often lying down on the ground, a behaviour which may cause the udder and some teats to become soiled, whereas some individuals rarely, or never, get soiled in that manner. Moreover, the milk producing animals exhibit individual differences as regards their inclination to develop certain unwanted health symptoms, such as teat infections, eczema or mastitis. The above described solution makes it possible to adapt the cleaning process in accordance with the needs of the individual animal such that an individual having a more "cleanly" behaviour may get a gentle cleaning action and another individual having a more "soiling" behaviour may get a more extensive cleaning action, thereby reducing the risk for developing symptoms like the above described.

According to an embodiment of the invention the control means includes means for causing an individually adapted duration of the cleaning action for the identified animal. This embodiment makes it possible to adapt the cleaning process in accordance with the needs for the individual animal such that an individual having a more "cleanly" behaviour may get a shorter cleaning action cycle, and another individual having a more "soiling" behaviour may get a longer duration of cleaning action cycle. This solution advantageously makes it possible to shorten the duration of the cleaning action for individuals having a "cleanly" behaviour, thereby increasing the milking capacity of the milking robot since a larger number of animals can be treated per time unit when the duration of the cleaning action is shortened for some individuals.

According to another embodiment of the invention the means for performing a cleaning action includes means for providing liquid on a teat. In this embodiment, said control means includes means for causing an individually adapted concentration of a pre-determined substance in the liquid for the identified animal. This solution enables the dispensing of an individualised amount of a substance, such as soap, onto the teat in connection with the cleaning process. In automatic milking systems, like the Voluntary Milking System™, VMS™, the animals decide to go to the automatic milking robot at their own will, and therefore some individuals exhibit their teats to cleaning more often than other individuals. When an animal has a habit of going to the automatic milking system frequently, and that animal also has a "cleanly" behaviour it is advantageous to adapt the cleaning action to that fact, e.g. by dispensing a reduced amount of the pre-determined substance. Moreover the teats of a milk producing animal are sensitive to touch, and the animals exhibit individual differences as regards their sensitivity to teat treatment.

An individual cleaning-, drying- and pre-milking treatment of each animal would be advantageous to optimise comfort and efficiency during handling. Outer conditions that could be considered in a fully individualised treatment are for instance time of the year, weather conditions and veterinary policies. Outer conditions may be sensed by means of a temperature measuring and/or humidity sensing equipment in connection with a computerised terminal, which is connected to a memory location of a unit for information storage. These sensed outer conditions could control an offset feature of the cleaning action. One example would be to increase the time of cleaning and the amount of cleaning substance during the cleaning action as a result of rainy outer conditions and therefore an additional soiling of the animal to be milked. Dryer and cleaner conditions would lead to a shorter time of cleaning and less used cleaning substance during the cleaning action.

Other additional and advantageous effects gained by embodiments of the invention include an enhanced flow rate of animals through the automatic teat treatment system as a result of the individualised treatment but also an optimised and thereby reduced use of resources such as water and electricity.

SHORT DESCRIPTION OF THE DRAWINGS

The present invention will now be discussed in more detail with reference to preferred embodiments of the present invention, given only by way of example, and illustrated in the accompanying drawings, in which:

FIG. 1 schematically shows one embodiment of the teat treatment apparatus, which below is described in more detail.

DETAILED DESCRIPTION

Figure 1:
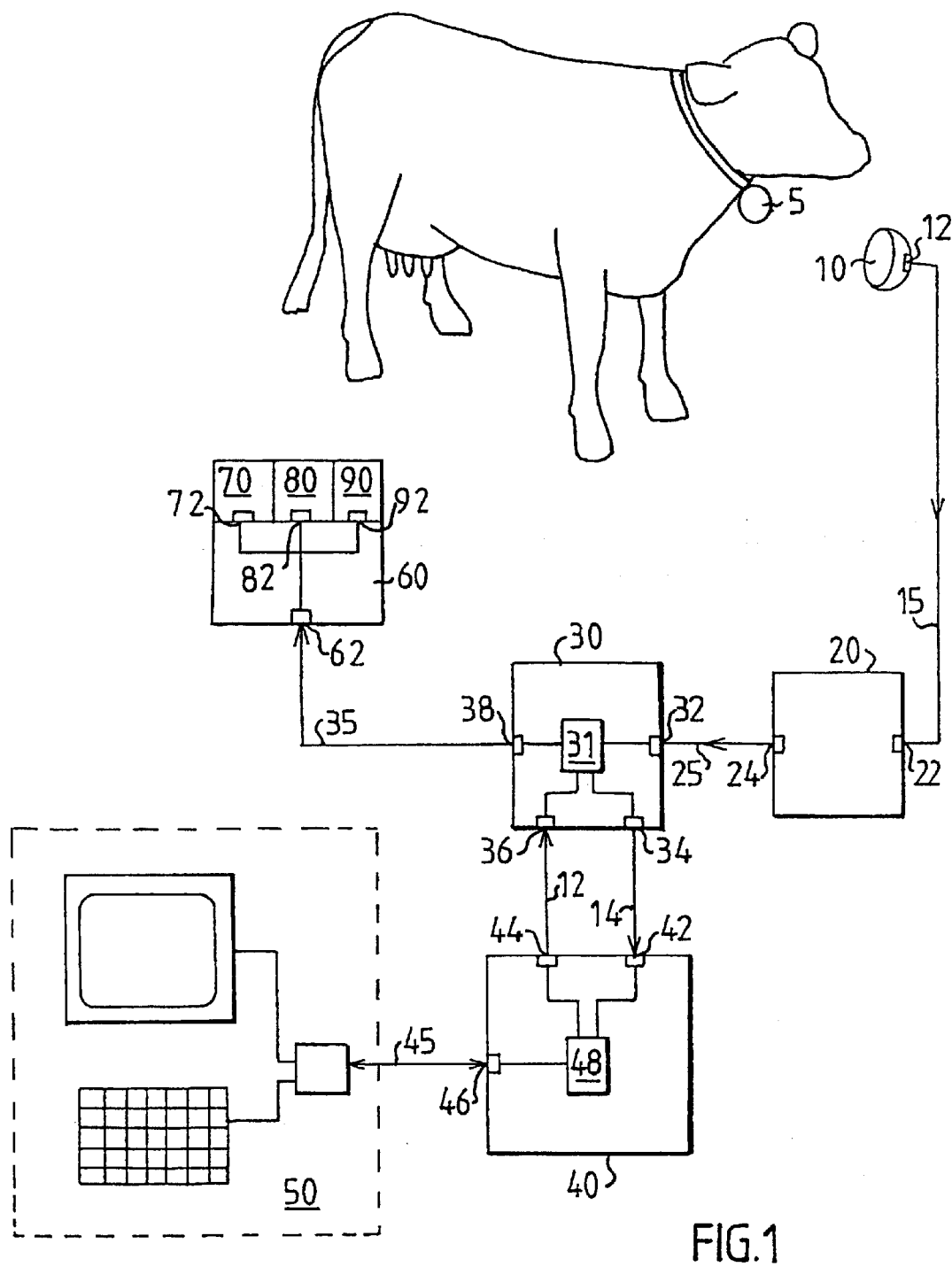

With reference to FIG. 1, an embodiment of the invention comprises a sensing means 10, which is sensitive to a significant feature, for instance an identification badge 5, which may be used for unambiguous determination of a particular animal's identity. A sensor signal is produced at the sensing means 10 and is then sent from its output 12 via a communication means 15, such as for instance a wire, infrared transmission etc. This sensor signal is then received at an input 22 of an identification means 20. Said identification means 20 delivers an identity signal from its output 24 to an identification input 32 of a control unit 30, which constitutes a central device of the apparatus. Its operation is explained below more in detail with reference to FIG. 2. Said control unit 30 is equipped with a memory location 31 and is connected with an information storage unit 40 via a transceiver and communication means 12 and 14. The control unit 30 has an output 34, for a data request, in which request the identity is contained. Such a data request is transmitted in response to reception of the identity signal on the input 32 via another communication means 25. The data request is sent via the communication means 14 and its response is received via the other communication means 12.

The data request which is sent from the control unit 30 is received by the information storage unit 40 via a data input 42. In response to the data request the information storage unit 40 delivers a time value parameter on its output 44. The time value parameter is received on the input 36 of the control unit 30. In order to change or adjust the contents of the information storage unit 40, this unit 40 is, via a communication means 45, connected to a terminal 50, by which the contents of the memory location 48 in the information storage unit 40 may be changed via an adjustment port 46 mounted on the information storage unit 40. The information which is then sent back to the control unit 30 is the basis for the current cleaning instructions which now may be sent from the control unit 30 to the executive unit 60, whose purpose is cleaning the teats of the animal. The unit 60 may include several treatment tools, such as for instance a brushing means 70, a spraying means 80 and a container 90 for appropriate dispense of cleaning substance. Said cleaning tools perform the cleaning action during an adjustable time duration of cleaning T. Adjustment data are put together and constitute the instructions to clean which are sent via an instructions output device 38 of the control unit 30, via a communication means 35, to the instructions input 62 of the executive unit 60. From this input, information is delivered to and received by inputs 72, 82 and 92 of treatment tools included in the executive unit 60 such as a brushing means 70, a spraying means 80 with a liquid spraying nozzle and a container 90 for cleaning substance. The control of the teat treatment tools 70, 80, 90 will be further described below. Thus, the time duration of the cleaning procedure utilising these cleaning tools is individually adaptable.

Still with reference to FIG. 1, a first embodiment of a cleaning procedure in accordance with the invention is described, which embodiment enables a variation of the time duration T of the teat cleaning procedure. The procedure during the cleaning action will be further described in the following.

When an animal enters a stall the identity of the animal is detected. If information about this individual exists within the system, the treatment of the animal is individually adjusted according to this particular individual's requirements. As an example, the time duration of cleaning is reduced for a more "cleanly" animal compared with the mean time of cleaning and vice versa for a more "soiling" animal. The control unit 30 utilises information from the information storage unit 40 in order to set the most appropriate duration time based on relevant statistics, observations or detection data, in response to the sensed identity of the animal. The embodiment of FIG. 1 constitutes a flexible way of connecting the units involved according to the present invention.

Figure 2:
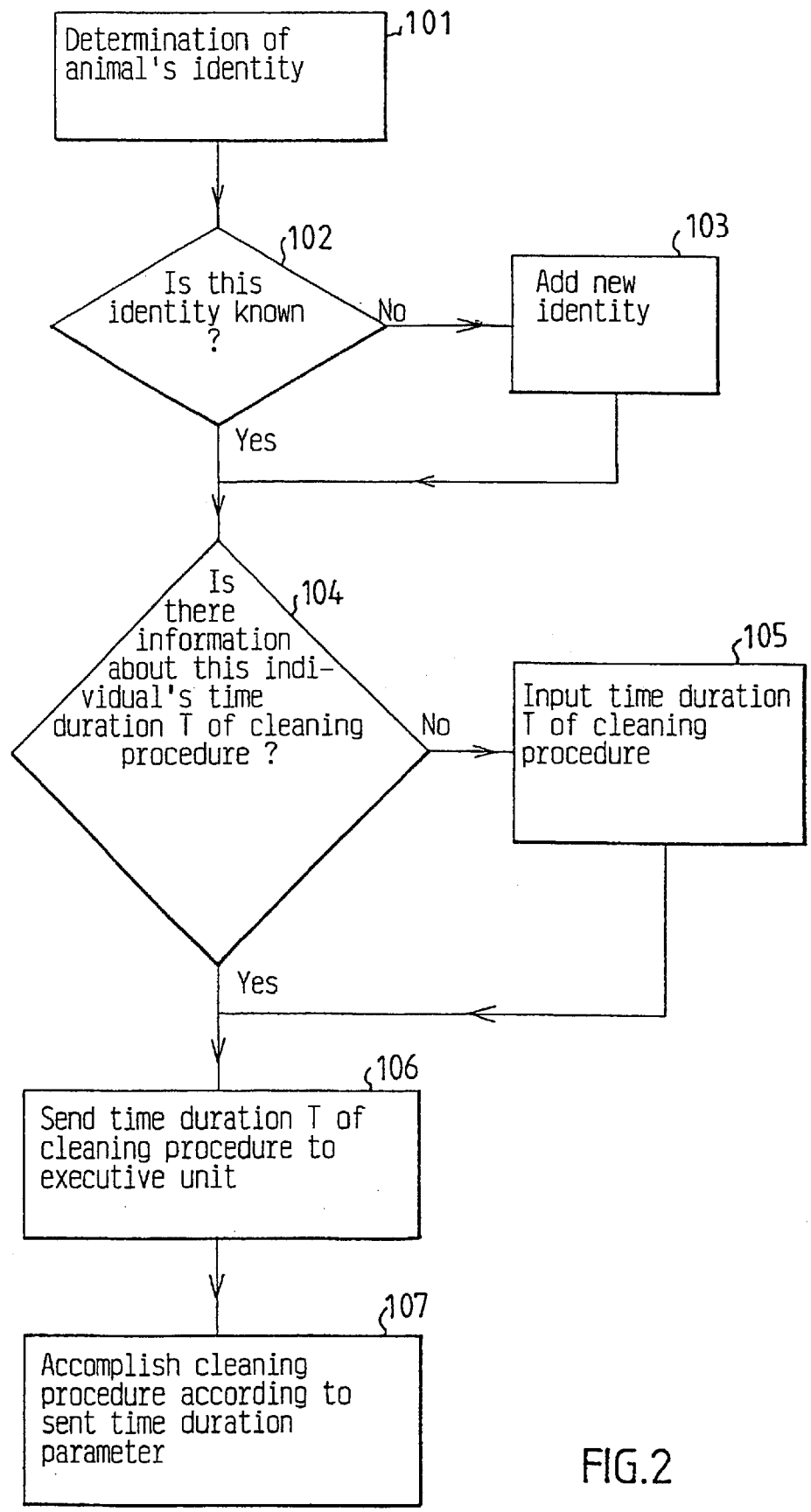
FIG. 2 is a flow chart describing the operation of the teat treatment apparatus depicted in FIG. 1.

FIG. 2 outlines the operation of the apparatus and particularly the co-operative function of the control unit 30 and the information storage unit 40. The outline of FIG. 2 is modelled as a flow chart. Above in the uppermost symbol (step 101) the determination of the animal's identity is described. In the following (step 102) an inquiry is made to the identification unit 20 whether this animal's identity is already known by the apparatus. If not, either the new individual is added (step 103) to the contents of the information storage unit 40 or a new inquiry is made about this particular animal's time duration T of its cleaning procedure. The question reads: is there any information concerning the time duration T for cleaning of this animal? (step 104) If not, information about the time duration of the cleaning procedure is to be added to the system (step 105), either manually or automatically through feedback and input based on various sensing units. If the system contains required information, the duration parameter T corresponding to the identity of the particular animal in question is sent to the executive unit 60, which unit 60 together with the cleaning tools 70, 80 and 90 are responsible for carrying out the teat cleaning. When the time duration parameter T arrives at the executive unit 60 and is delivered to the cleaning tools 70, 80 and 90, they accomplish the cleaning procedure in accordance with their instructions, i.e. cleans the animal for a time period which is specified by the time duration parameter T. The time duration is understood to be the time interval from starting the cleaning action to ending this cleaning action. In one embodiment according to the present invention, the time duration T of the teat cleaning procedure is defined to be the time interval between turning on the liquid flux and turning it off again during the cleaning procedure. Said liquid may be water with or without addition of cleaning substances such as soap and/or other detergents in various concentrations.

Figure 3:
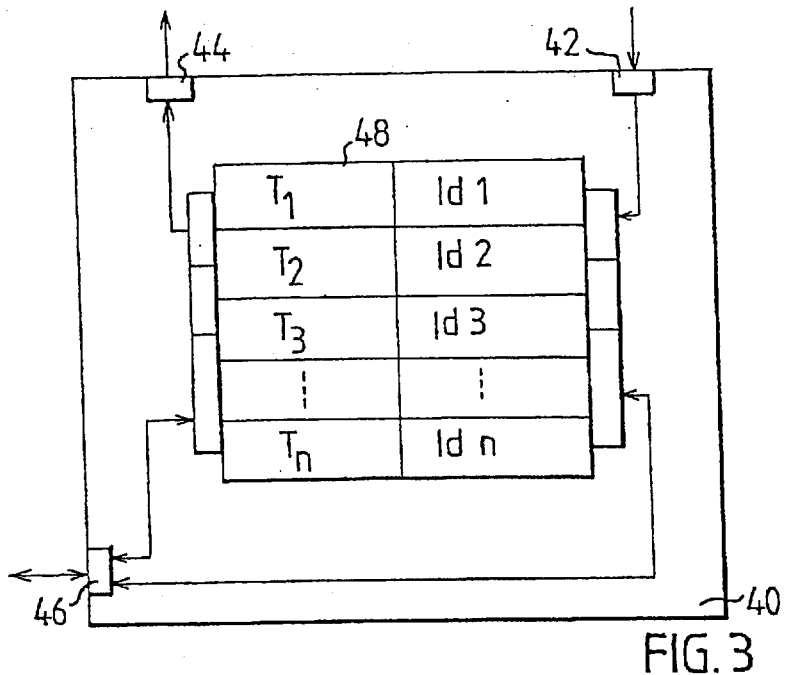
FIG. 3 depicts the information storage unit of FIG. 1 with particular interest in its memory location.

In FIG. 3, a part of the embodiment of FIG. 1 is depicted. FIG. 3 shows an interior of the information storage unit 40. The information storage unit 40 has a memory 48 provided with data records relating to a plurality of individual animals, wherein a data record includes control information indicative of a pre-determined cleaning requirement for an individual animal. A data record includes information about an individual animal's identity as well as corresponding information about its treatment. These data records constitute an information data base. According to an embodiment of the invention the control information in each data record includes a parameter T, which parameter T represents the time duration of teat cleaning, tied to a specific animal's identity Id.

When a data request containing identification information, from the control unit 30 via the communication means 14, arrives at the information storage unit 40 and its data input 42, it locates its identity Id, which identity Id in time points at the location of a corresponding time duration parameter T. This time duration parameter T is then forwarded back to the control unit 30 via the data output 44 of the information storage unit 40 and through communication means 12.

Each data record contained in the information storage unit 40, in this case the pointer Id as well as the parameter T, is accessible from outside via a bi-directional adjustment port 46, enabling manual setting of Id as well as of T when manual tuning is desirable. This manual setting is performed in a suitable and user friendly way by means of the terminal 50, which is further described in FIG. 4.

Figure 4:
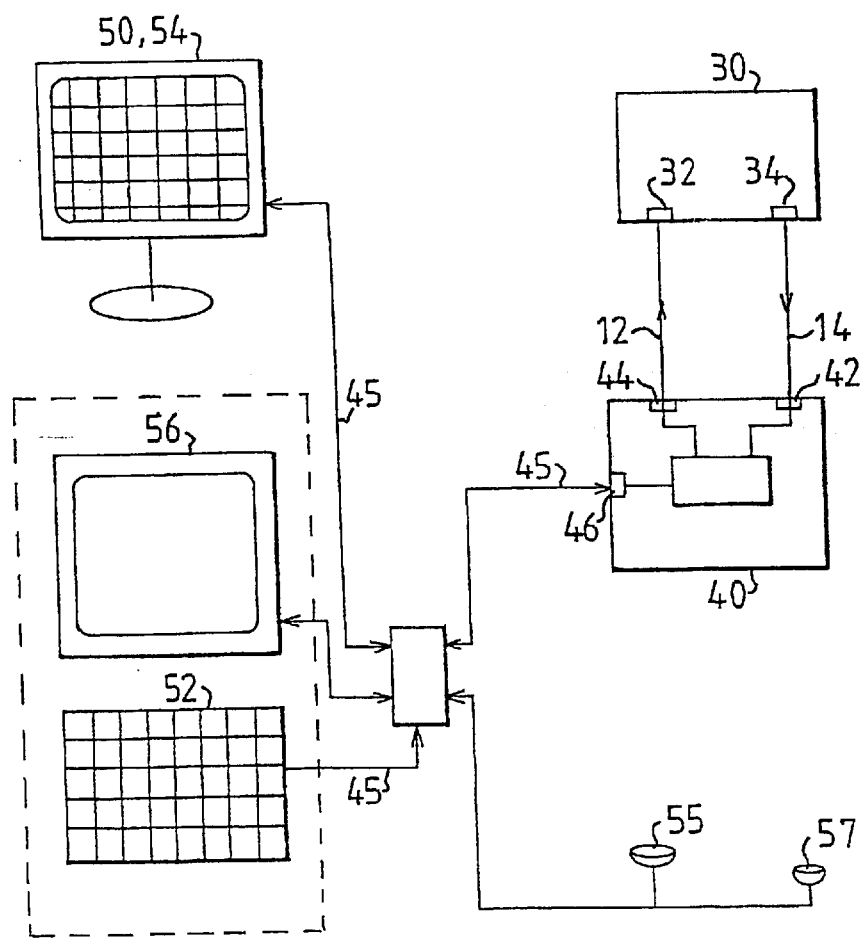
FIG. 4 shows the information storage unit of FIG. 1, with various types of input and display interfaces connected thereto.

FIG. 4 illustrates another embodiment of the terminal 50, which is coupled to the information storage unit 40 shown in FIG. 1. The time duration parameter T may be adjusted for lenient and optimum teat treatment of animals subjected to this handling. A process of manual input of any parameter by means of a connected terminal 50 may be carried out in the adjacency of the animal or at any distance through an ordinary keyboard 52 or touch screen 54 interface. It is of great importance that this input can be done in a flexible and user friendly way, and the touch screen 54 is such a flexible means for data input. The display of information is accomplished preferably by means of a screen 56 or other similar displaying device such as for instance the touch screen 54. Several types of transmission means 45 can be used for information transfer and the data is received by the information storage unit 40 via the bi-directional adjustment port 46. A manual input operation may be done after a listing of parameters contained in a memory location 48 of the information storage unit 40 on any appropriate interface. Adjustments in parameters values are transferred to the memory location 48 via the transmission means 45 and the bi-directional adjustment port 46 of the information storage unit 40 and replace prior parameters in the memory location 48. A sensor 55 for temperature determination and a humidity sensor 57 equipment is connected to the computerised terminal 50. These sensors 55, 57 add information about outer conditions to be utilised within the individual adaptation of the cleaning action, for example through an automatic or manual offset mechanism integrated in the system, which may be used for adjusting cleaning parameters due to outer conditions, such as humidity and temperature. An advantage with this approach is even better adaptation of the cleaning action to the requirements of the present weather situation.

Figure 5:
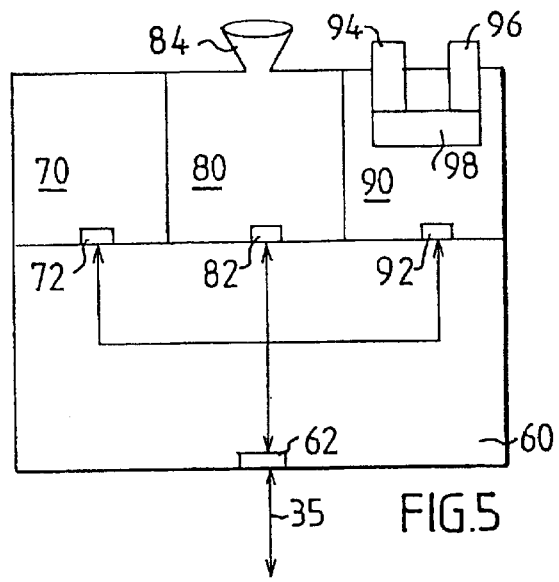
FIG. 5 shows the executive unit in more detail with its tools for teat cleaning and additional teat treatment operations.

In the above described embodiments, individualisation of an animal's treatment is accomplished through adjustments in one treatment parameter, namely the time duration of cleaning T. However, according to other embodiments, a plurality of parameters concerning various aspects of the treatment procedure may be individually adapted to each individual's requirements. Some of the requirements depend on outer conditions and others are due to animal related properties. A number of the animal related properties are skin quality, dirt inclination, lying behaviour, position in the lactation cycle, mastitis sensitivity, breed type. An animal with sensitive teat skin quality may with an adaptive and individualised system be treated more gently than another animal with more robust teat skin quality. The time of cleaning may be adapted to the animal's lying behaviour as cleaning parameters corresponding to the dirt inclination as a consequence of the animal's lying behaviour or breed type are present in the cleaning apparatus. The apparatus also allows for combinations treatments. For instance, an eczema inclined animal could be cleaned with a mild cleaning substance for an extended time duration while a non eczema inclined animal may be subjected to a stronger cleaning substance for a reduced duration of time. Such an individualised treatment would imply an enhanced flow rate of animals through the cleaning procedure while a satisfactory level of cleanliness and healthiness is maintained in the animal herd. With reference to FIG. 5 is introduced an arrangement suitable for such an individualised operation. The above described procedure requires a plurality of vessels 94, 96 containing cleaning substances of different strength as well as arrangements 98 enabling a portioning out of the cleaning substance in a predetermined volume. In connection with the spraying tool 80 is mounted a liquid spraying nozzle 84 for efficient application of a teat cleaning medium. In the following embodiments, there is described a broad range of adjustable individualised treatment parameters, some of which are disclosed below.

Figure 6:
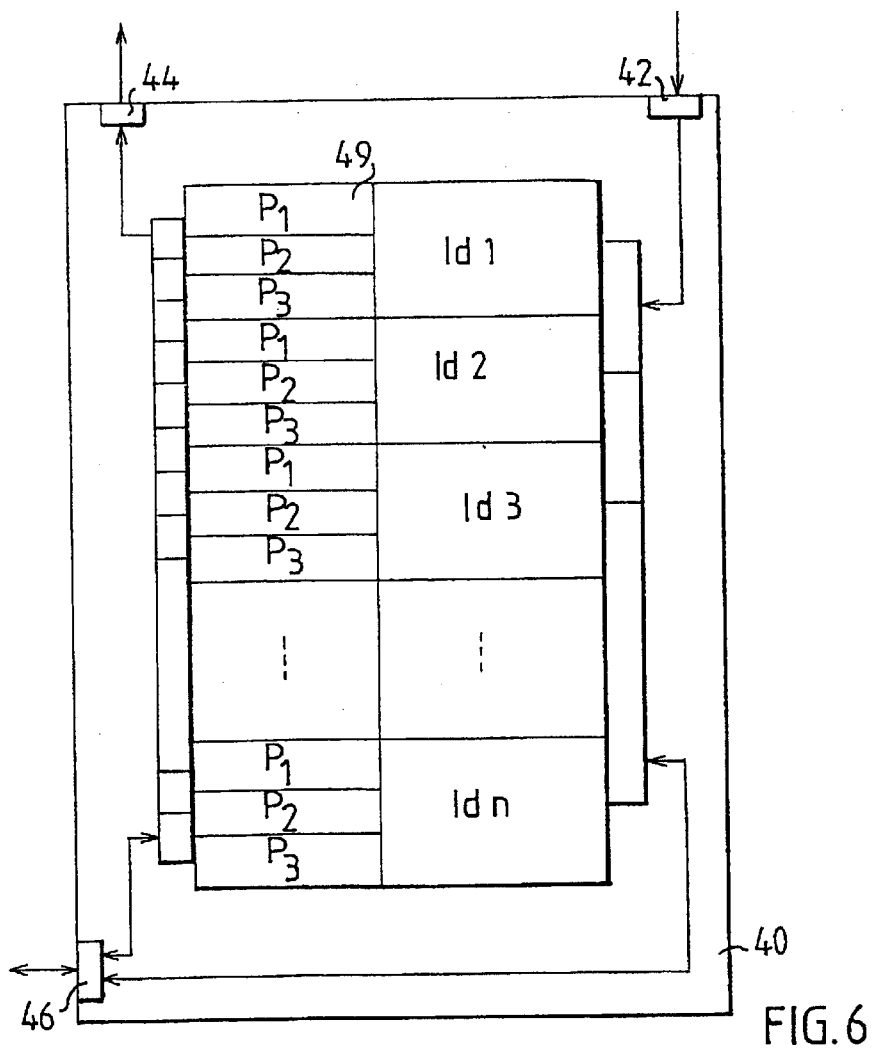
FIG. 6 depicts another embodiment of the information storage unit with an enlarged memory location.

FIG. 6 depicts a second embodiment of the information storage unit 40, having an expanded memory location 49 with data records comprising a plurality of parameters. Information about the animal's identity is supplied from the control unit 30 via said communication means 14. Similar to the process described above and in FIG. 2, this identification information is compared with all existing identities, Id 1 to Id n, within the memory location 48 of the information storage unit 40 and if correspondence is found, it is allocated one existing data record comprising a set of parameters or if no correspondence is found, i.e. the individual is unknown, a new data record is created, the new data record comprising a set of parameters assigned to this new individual. This second embodiment differs from first embodiment shown in FIG. 3, in that the data record according to the second embodiment includes a plurality of parameters. Each parameter $P_1$; $P_2$; $P_3$; . . . ; $P_n$ represents a certain variable action within the teat treatment procedure enabling optimisation of the cleaning action by means of the treatment tools 70, 80 and 90 of the executive unit 60.

In order to elucidate this reasoning a bit, an embodiment is presented in FIG. 6, assuming a data record comprising three parameters $P_1$; $P_2$; $P_3$, representing time of cleaning $P_1$, time of drying $P_2$ and dispense of a cleaning substance $P_3$. It is also assumed that corresponding parameter values of $P_1$; $P_2$; $P_3$ already have been added to the teat treatment apparatus and is contained in the storage cells of the memory location 49 belonging to the information storage unit 40. When a signal arrives at the information storage unit 40 via the data input 42, which signal contains the identity Id of the animal in question, the correct memory location cell is found in a data record of the memory 48. The cell pointed out is connected to said set of treatment parameters, in this particular case $P_1$; $P_2$; $P_3$. These parameters are sent to the control unit 30, via the communication means 12, which unit 30 instructs cleaning tools 70, 80 and 90 of the executive unit 60 to start the treatment procedure of this particular animal. The control unit 30 is responsible for controlling that the treatment procedure is being done in accordance with the sent parameters $P_1$; $P_2$; $P_3$. Two additional possible parameters to adjust are the type of cleaning substance for teat application $P_4$ and the amount of said cleaning substance $P_5$.

According to another embodiment of the invention, manual adjustments of the parameter values are feasible. Additionally, said three parameters $P_1$; $P_2$; $P_3$ may be expanded to an arbitrary number of parameters $P_1$; $P_2$; $P_3$; . . . ; $P_n$ controlling a large number of variables within the treatment procedure. For enabling such adjustments, the system is, just like the system of FIG. 3, designed in a way allowing for manual settings and adjustments of values to certain predetermined values, preferably by means of a computerised terminal 50 with keyboard 52 or another handy interface such as touch screen 54. After determination of the appropriate set of parameters for a certain individual's treatment, this set of parameters is delivered back to the control unit 30 via the communication means 12. Said control unit 30 now possesses a sufficient and appropriate set of parameters for controlling different tasks in connection with the cleaning tools 70, 80 and 90 of the executive unit 60 and thus forwards operative instructions to the executive unit 60, which are further delivered to the cleaning tools 70, 80 and 90 resulting in an individualised and optimum teat treatment operation with a cleaning action which may begin.

Valuable circumstances to utilise by storing in the memory location 49 of the information storage unit 40 as treatment parameters and to take into consideration by the system may be outer conditions, such as weather or season related conditions as well as various animal specific properties. Upon usage, this data allows for an individualised and optimum teat cleaning and teat treatment of the animals as regards both comfortable breed handling and efficient and sanitary dairy production.

Data contained in the memory location 49 of the information storage unit 40 is the basis for controlling the variation of the executive unit 60 treatment parameters, such as the time duration of cleaning parameter T. Some valuable treatment parameters to vary and individually adapt are for instance the position, intensity and type of the cleaning tool, the time duration of cleaning, which already has been described and duration of drying, pre-milking parameters, type of and/or quantity of cleaning substance. A large number of other additional parameters may be valuable to adapt to individual needs.

An alternative way of individualising cleaning and treatment of an animal is to run a fixed and predetermined cleaning and/or treatment program more than once when needed. Such an approach is a way of simplifying the cleaning and treatment procedure in order to minimise computer processing capacity, while the possibility of individualising the procedure to each animals needs is maintained. An animal known to have a greater need for cleaning than most other animals, is thus subjected to at least one, but sometimes several additional rounds of the cleaning procedure.

A further parameter considered by the apparatus according to the invention is the type of treatment tool 70, 80, 90 being used. One feature of the apparatus is that the treatment tools 70, 80, 90 are carefully chosen and changed in dependence of the individual animal to be cleaned or treated. One particular animal may require a more rough cleaning by means of a brushing means 70 and for another animal, it may be sufficient to use a cleaning and treating teatcup, which in one embodiment cleans the animal's teats by means of pulsating jets of whirling liquid.

Yet another way of individualising the treatment is to use an image capturing means, for instance a video camera or similar equipment, to monitor the udder region of an animal. The cleaning and treatment procedure in accordance with the present invention may thus be set as well as tuned in dependence of the visual information transferred about an individual animal, which information is supplied by at least one captured image.

Figure 7:
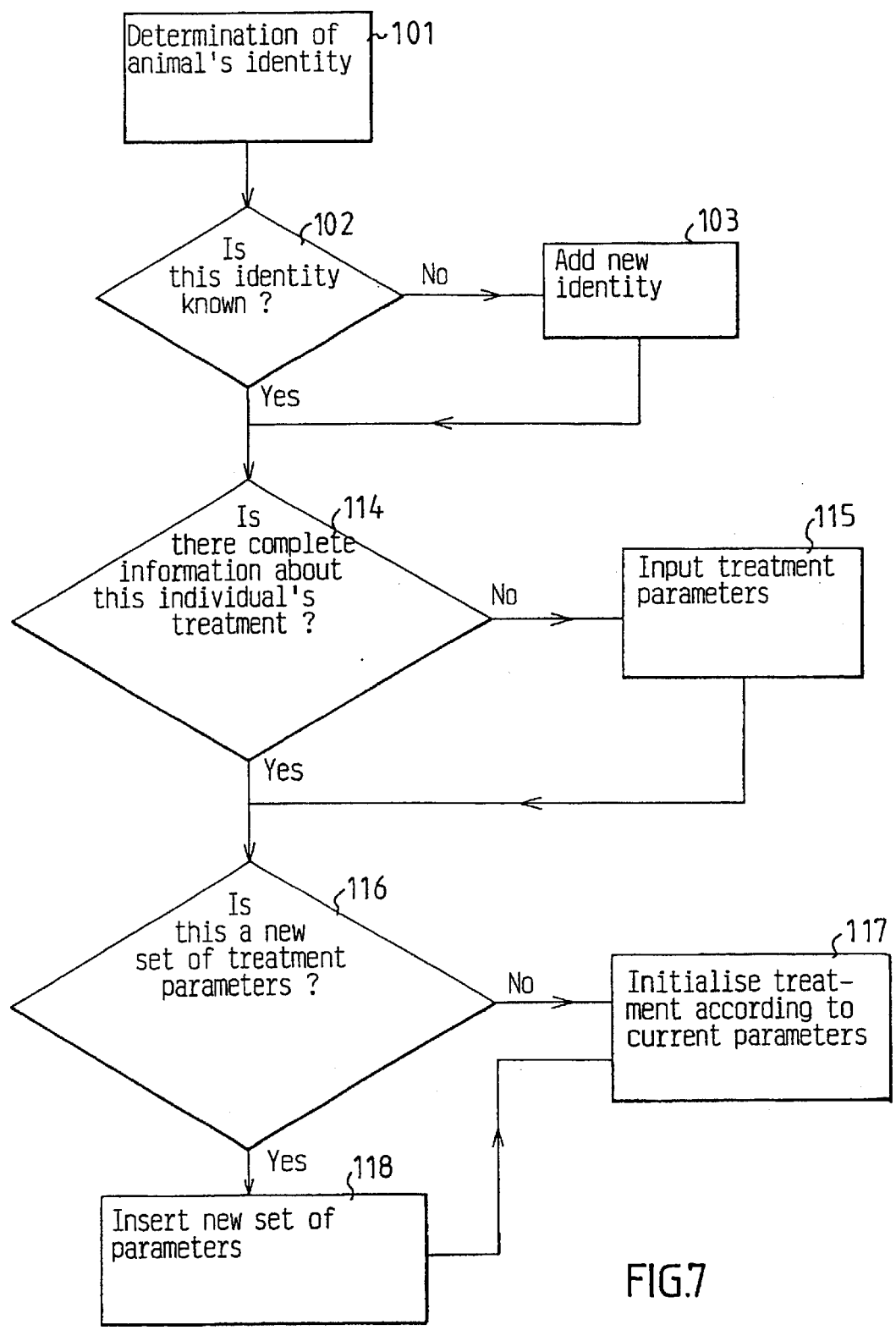
FIG. 7 is a flow chart describing the operation of an alternative embodiment of the teat treatment apparatus.

With reference to FIG. 7, there is shown an alternative embodiment with many similarities in comparison with the flow chart of FIG. 2. The method of operation according to the FIG. 7 embodiment may be with all of the above described physical embodiments. The flow chart of FIG. 7 describes a process of comparing an existing specific parameter or an existing set of parameters with new a parameter or a new set of parameters. The first three steps in the sequence, 101, 102 and 103 of FIG. 7 are equivalent to those corresponding steps in FIG. 2. Subsequently (step 114) an inquiry is made for determining whether all treatment parameters exist in the memory location 48 of the information storage unit 40 (see FIG. 1). If the answer is no, additional parameters are to be added to the set of parameters (step 115), or default settings which are stored in the comparative memory location 31 of the control unit 30 may be utilised unless supplementary information in form of additional treatment parameters is added to the system, before the next step in the sequence, which is the comparison procedure (step 116) can begin. In this comparison inquiry (step 116) is determined whether differences appear between the existing set of animal parameters, which is stored in the comparative memory location 31 of the control unit 30 and the proposed set of animal parameters, which is stored in the memory location 48 of the information storage unit 40. If no such differences between the sets of parameters are found, a message is sent to the control unit 30, which instructs the executive unit 60 to carry on with the existing treatment according to its instructions (step 117). When differences do occur, between the existing set of animal parameters and the proposed set of animal parameters, the information storage unit 40 delivers all changes in parameter values, depending on the animal's properties or weather related outer conditions to the control unit 30 (step 118), and said control unit 30 instructs the executive unit 60 to continue the treatment in accordance with these new settings (step 117). Alternatively according to another embodiment of the invention, the system may allow variations in the teat cleaning action depending only on weather conditions.

This alternative second embodiment constitutes a potentially faster starting system, especially when the different sets of parameters are similar, in comparison with the other embodiment. With this alternative embodiment, an immediate start of the process can also be envisaged, whereby the ending time of cleaning procedure is controlled by the control unit 30 after having received the relevant set of animal parameters. Such a procedure is well suited to network controlled operations, which appears to become more and more frequently used. The method here described is an efficient and flexible method as the information storage unit 40 is called less frequently and measures are taken only when required.

Input of information into the memory location 48 of the information storage unit 40 via the adjustment input 46 may occur in many different ways. Manual input via a user friendly interface 52, 54 connected to a terminal 50 has already been mentioned, but the entire process of detecting, collecting and transferring data may also be done automatically. A fully automatic process comprises sensors for detection of both outer conditions and animal properties, automatic transfer of data via various communication means 45 to collection of information in the memory location 48 of the information storage unit 40. The operator of course has the ability to control this semi- or fully automatic process, for safety reasons as well as for practical reasons.

This application describes a computerised control system in detail. However, modifications within the framework of this applications are conceivable, for instance using punched cards or hardware coded transistor circuits for controlling the operation of the units described.

What is claimed is:

1. An apparatus for cleaning teats of an animal; the apparatus comprising:
   a teat cleaning device (60) having cleaning means (70, 80, 90) for performing a cleaning action with regard to a teat of an animal; characterised by
   means (10, 15, 20) for establishing the identity of the animal to be cleaned;
   control means (30, 31, 40, 48) for controlling the teat cleaning device (60) in dependence on the established identity such that an individually adapted cleaning action is obtained, said control means (30, 31, 40, 48) including an information storage unit (40) having data records relating to a plurality of individual animals, wherein a data record includes control information indicative of a pre-determined cleaning requirement for an individual animal;
   means (48, 14) for fetching a selected control information data record in response to the established identity; and
   means (48, 12, 35) for delivering the selected control information (T) to the teat cleaning device (60) so as to cause the teat cleaning device (60) to perform the cleaning action in accordance with the pre-determined cleaning requirement for the identified animal,
   wherein said control means (30, 31, 40, 48) includes means ($T_1$, $T_2$) for causing an individually adapted duration of the cleaning action for the identified animal.

2. Apparatus as claimed in claim 1, characterised in that said control means (30, 31, 40, 48) includes means ($T_1$, $T_2$) for causing an individually adapted duration of the cleaning action to be re-performed on the identified animal.

3. Apparatus according to claim 1, characterized in that
   said cleaning means (70, 80, 90) for performing a cleaning action includes means for providing liquid on a teat; and
   said control means (30, 31, 40, 48) includes means (94, 96, 98) for causing an individually adapted concentration of a substance in the liquid for the identified animal.

4. Apparatus according to claim 1, characterised in that said control information in a data record for an animal includes:
   a parameter (T, $P_1$) indicative of a pre-determined duration of the cleaning action for the identified animal,
   a parameter ($P_2$) indicative of a pre-determined duration of the drying action for the identified animal, and
   a parameter ($P_3$) indicative of a concentration of a pre-determined substance in a liquid provided to a teat.

5. Apparatus according to claim 1, characterised in that said control information in a data record for an animal includes:
   a parameter (T, $P_1$) indicative of a duration of the cleaning action for the identified animal,
   a parameter ($P_4$) indicative of a type of substance to be provided to a teat in connection with the cleaning action, and
   a parameter ($P_5$) indicative of an amount of said substance to be provided to a teat.

6. Apparatus according to claim 1, characterised by means (50, 45, 46) for setting control data for the individually adapted cleaning action.

7. Apparatus according to claim 1, characterised in that
   said cleaning means (70, 80, 90) for performing a cleaning action includes a nozzle (84) for ejecting a liquid towards a teat with an adjustable force; and
   said control information in a data record for an animal includes a parameter indicative of a pre-determined liquid ejection force so as to cause the nozzle (84) to eject the liquid towards a teat with the pre-determined force.

8. Apparatus according to claim 1, characterised by means (55, 57) for adjusting said control information in dependence on environmental conditions such that said individually adapted cleaning action also is adapted to environmental conditions affecting the animal.

9. Automated milking system, characterised in that said automated milking system comprises an apparatus according to claim 1.

10. A method for cleaning teats of an animal with cleaning means for cleaning the teats, the method comprising the step of controlling a cleaning action of the means for cleaning in dependence on an established identity of the animal by causing an individually adapted duration of the cleaning action for the animal.

* * * * *